(12) United States Patent
Cui et al.

(10) Patent No.: US 10,909,246 B2
(45) Date of Patent: Feb. 2, 2021

(54) TRUSTED KERNEL-BASED ANTI-ATTACK DATA PROCESSOR

(71) Applicant: C-SKY Microsystems Co., Ltd., Zhejiang (CN)

(72) Inventors: Xiaoxia Cui, Hangzhou (CN); Chunqiang Li, Hangzhou (CN); Guangen Hou, Hangzhou (CN); Li Chen, Hangzhou (CN)

(73) Assignee: C-SKY Microsystems Co., Ltd., Zhejiang (CN)

( * ) Notice: Subject to any disclaimer, the term of this patent is extended or adjusted under 35 U.S.C. 154(b) by 0 days.

(21) Appl. No.: 16/175,710

(22) Filed: Oct. 30, 2018

(65) Prior Publication Data

US 2019/0073477 A1 Mar. 7, 2019

Related U.S. Application Data

(63) Continuation of application No. PCT/CN2018/096759, filed on Jul. 24, 2018.

(30) Foreign Application Priority Data

Aug. 1, 2017 (CN) .......................... 2017 1 0648239

(51) Int. Cl.
*G06F 21/57* (2013.01)
*G06F 9/54* (2006.01)
*G06F 21/74* (2013.01)

(52) U.S. Cl.
CPC .............. *G06F 21/57* (2013.01); *G06F 9/545* (2013.01); *G06F 21/74* (2013.01)

(58) Field of Classification Search
CPC .......... G06F 21/57; G06F 21/74; G06F 9/545; G06F 12/1408
See application file for complete search history.

(56) References Cited

U.S. PATENT DOCUMENTS 4,519,032 A * 5/1985 Mendell ................. G06F 9/463
710/260
10,565,141 B1 * 2/2020 Chaiken ................. G06F 13/24
(Continued)

FOREIGN PATENT DOCUMENTS

CN 106599717 A * 4/2017 ............. G06F 21/52
CN 106599717 A 4/2017
(Continued)

OTHER PUBLICATIONS

ARM, Exception and Interrupt Handling, https://static.docs.arm.com/100933/0100/aarch64_exception_and_interrupt_handling_100933_0100_en.pdf?_ga=2.34449505.1324495040.1575287160-1725963567.1575287160, 2017, pp. 1-23.*
(Continued)

*Primary Examiner* — Farid Homayounmehr
*Assistant Examiner* — Raied A Salman
(74) *Attorney, Agent, or Firm* — Finnegan, Henderson, Farabow, Garrett & Dunner, LLP

(57) ABSTRACT

The present disclosure provides trusted kernel-based anti-attack data processors. One exemplary processor comprises: a trusted kernel exception vector table configured to provide a handling entry for kernel switching; a trusted kernel stack pointer register storing a trusted kernel stack pointer that points to a trusted kernel stack space; and a trusted zone in the trusted kernel stack space, the trusted zone including a program status register storing a flag bit of a starting kernel for the kernel switching, a program pointer, and a general register. When the data processor performs kernel switching from a non-trusted kernel to a trusted kernel, the trusted kernel locates the handling entry for the kernel switching and performs the switching. An underlying software protection mechanism can be provided for switching entries of a trusted kernel. Therefore, security during switching pro-
(Continued)

cesses between a trusted kernel and a non-trusted kernel can be improved.

8 Claims, 4 Drawing Sheets

(56) References Cited

U.S. PATENT DOCUMENTS

| | | | | |
|---|---|---|---|---|
| 2003/0225817 | A1* | 12/2003 | Ishwar | G06F 9/485 |
| | | | | 718/107 |
| 2011/0302589 | A1* | 12/2011 | Aussagues | G06F 9/5044 |
| | | | | 718/104 |
| 2014/0078530 | A1* | 3/2014 | Lee | G06F 21/81 |
| | | | | 358/1.13 |
| 2014/0122902 | A1* | 5/2014 | Isozaki | G06F 12/1433 |
| | | | | 713/193 |
| 2016/0103718 | A1* | 4/2016 | Jiang | G06F 13/4068 |
| | | | | 710/310 |
| 2016/0283409 | A1* | 9/2016 | Pandey | G06F 21/53 |
| 2018/0191494 | A1* | 7/2018 | Vembu | H04L 9/14 |
| 2019/0073477 | A1* | 3/2019 | Cui | G06F 21/57 |
| 2019/0354679 | A1* | 11/2019 | Krten | G06F 21/57 |

FOREIGN PATENT DOCUMENTS

| | | | | |
|---|---|---|---|---|
| CN | 106775971 | A | 5/2017 | |
| CN | 106778365 | A * | 5/2017 | |
| CN | 107463856 | A * | 12/2017 | G06F 21/52 |
| CN | 107463856 | A | 12/2017 | |
| WO | WO 2019/024708 | A1 | 2/2019 | |
| WO | WO-2019024708 | A1 * | 2/2019 | G06F 21/52 |

OTHER PUBLICATIONS

Atreyee Kundu, et al., Stabilizing switched nonlinear systems under restricted switching, HSCC '18: Proceedings of the 21st International Conference on Hybrid Systems: Computation and Control (part of CPS Week)Apr. 2018 pp. 101-110.*

PCT International Search Report dated Sep. 30, 2018, issued in corresponding International Application No. PCT/US2018/096759 (14 pgs.).

Extended European Search Report dated Jun. 22, 2020, issued in EP Application No. 18841743.0 (27 pages).

* cited by examiner

TRUSTED KERNEL-BASED ANTI-ATTACK DATA PROCESSOR

CROSS REFERENCE TO RELATED APPLICATION

This application claims priority to International Application No. PCT/CN2018/096759 filed Jul. 24, 2018, which claims the benefits of priority to Chinese Application No. 201710648239.3, filed on Aug. 1, 2017, both of which are incorporated herein by reference in their entireties.

TECHNICAL FIELD

The present disclosure relates to the field of information security technologies, and in particular, to trusted kernel-based anti-attack data processors.

BACKGROUND

With the development of the mobile networks and the Internet of Things, as well as the extensive application of information technologies in production, operation and management, the society increasingly relies on network and information systems. On the other hand, the frequent occurrence of virus invasions, hacker intrusions, information thefts, and other events has made system security an increasingly important issue. Accordingly, system security has attracted more and more attention.

At present, security of system information is provided to some extent by the introduction of safe mode. In safe mode, hardware isolation is implemented in the system. The system kernel is the basis of the whole system. The kernel runs at the highest privilege level of the whole system. It manages and controls underlying hardware resources and provides securely isolated resource abstraction and access interfaces for upper-layer application programs. An operating system for running a trusted kernel in the safe mode is independent of an operating system running in a non-safe mode. The trusted kernel provides security authentication, encryption and decryption, sensitive data storage, and other services. Physical isolation through hardware security components ensures that an operating system in the non-safe mode cannot directly access resources in the safe mode, thus reducing the attack surface.

However, an attacker may still be able to, by various other means, obtain sensitive data by attacking a trusted kernel in the non-safe mode. Sometimes the attacks can even cause system crashes. Therefore, there is a need for techniques for implementing program control in a trusted kernel, so as to guard against such attacks.

SUMMARY

In light of the above problems, the present disclosure provides trusted kernel-based anti-attack data processor. According to some embodiments of the present disclosure, the trusted kernel-based anti-attack data processor can provide an underlying software protection mechanism in a trusted kernel, thereby enhancing the security of the trusted kernel.

According to some embodiments, the present disclosure provides trusted kernel-based anti-attack data processors. One exemplary processor comprises: a trusted kernel exception vector table configured to provide a handling entry for kernel switching; a trusted kernel stack pointer register configured to store a trusted kernel stack pointer that points to a trusted kernel stack space; and a trusted zone in the trusted kernel stack space, the trusted zone including a program status register configured to store a flag bit of a starting kernel for the kernel switching, a program pointer, and a general register. When the data processor performs kernel switching from a non-trusted kernel to a trusted kernel, the trusted kernel locates the handling entry for the kernel switching and performs the switching.

In some embodiments, the handling entry for kernel switching includes at least one of a kernel switching instruction exception entry and a trusted interrupt handling entry. In some embodiments, the trusted kernel locates the handling entry for the kernel switching and performs the switching by at least one of a kernel switching instruction, a kernel switching return instruction, or an interrupt response.

In some embodiments, when the trusted kernel performs the switching by the kernel switching return instruction, it can be determined, according to a flag bit of a starting kernel in the program status register, whether to return to the starting kernel or stay in the current kernel. In some embodiments, the trusted kernel locates the kernel switching instruction exception entry through an entry vector table called by a cross-kernel task.

In some embodiments, the trusted kernel locates the trusted interrupt handling entry through the trusted kernel exception vector table.

In some embodiments, when the trusted kernel is switched to the non-trusted kernel in response to a non-trusted interrupt, the trusted kernel saves the trusted zone in the trusted kernel stack space. After the non-trusted kernel handles the non-trusted interrupt, the non-trusted kernel is switched to the trusted kernel by calling the kernel switching return instruction. The trusted kernel can restore the trusted zone from the trusted kernel stack space. In some embodiments, the trusted zone is a zone before the trusted kernel is switched to the non-trusted kernel in response to the non-trusted interrupt.

In some embodiments, the non-trusted kernel can modify a starting kernel flag bit in the program status register and switch to the trusted kernel by executing the kernel switching return instruction. The trusted kernel can restore the trusted zone from the trusted kernel stack space. In some embodiments, the trusted zone refers to a zone before the trusted kernel switches to the non-trusted kernel for the first time.

According to the technical solutions provided in the present disclosure, the trusted kernel-based anti-attack data processor can provide an underlying software protection mechanism for switching entries of the trusted kernel. Security during the switching process between a trusted kernel and a non-trusted kernel can be improved.

DETAILED DESCRIPTION

To further describe the objectives, technical solutions and advantages of the embodiments of the present disclosure, the technical solutions in some exemplary embodiments of the present disclosure will be described in the following with reference to the accompanying drawings. It is appreciated that the embodiments described herein are merely some exemplary embodiments of the present disclosure. Based on the embodiments in the present disclosure, other embodiments can be obtained by those of ordinary skill in the art based on the principles described herein. Such embodiments shall all be encompassed in the protection scope of the present disclosure.

Figure 1:
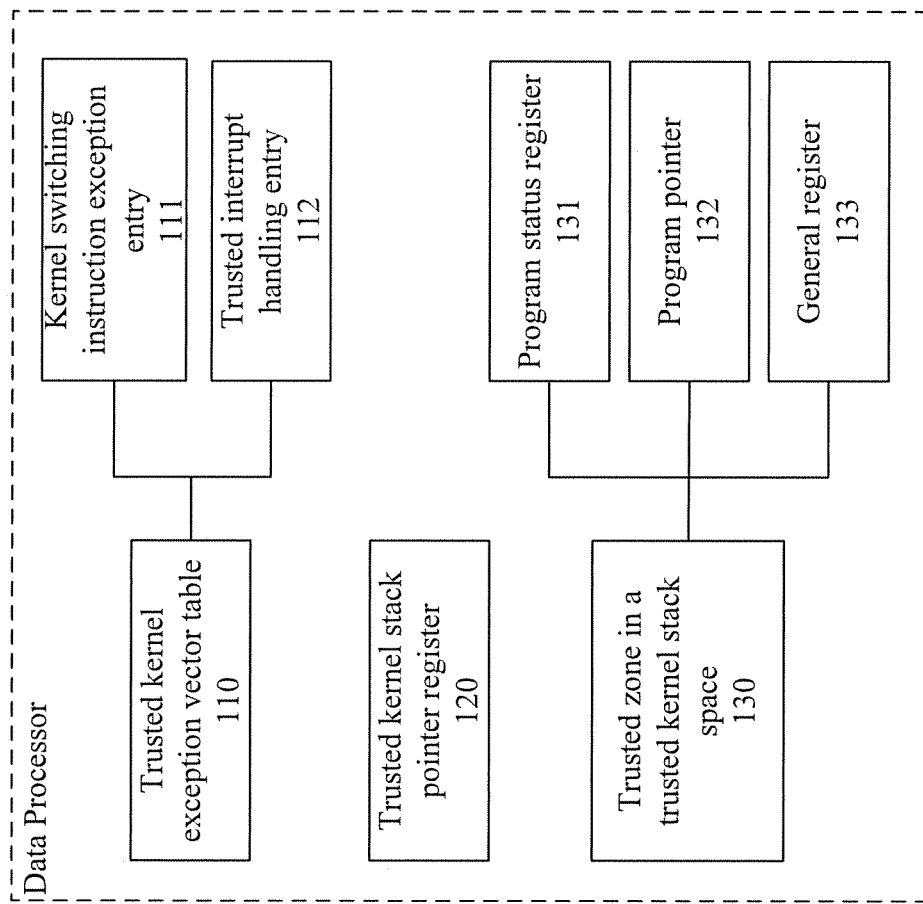
FIG. 1 is a schematic diagram of an exemplary architecture of a trusted kernel-based anti-attack data processor according to some embodiments of the present disclosure.

According to some embodiments of the present disclosure, trusted kernel-based anti-attack data processor is provided. FIG. 1 shows a schematic diagram of an exemplary architecture of a data processor 100 according to some embodiments the present disclosure. As shown in FIG. 1, the data processor 100 includes a trusted kernel exception vector table 110, a trusted kernel stack pointer register 120, and a trusted zone 130 in a trusted kernel stack space.

In some embodiments, trusted kernel exception vector table 110 can include two kinds of handling entries of kernel switching, e.g., a kernel switching instruction exception entry 111 and a trusted interrupt handling entry 112. When the data processor performs kernel switching from a non-trusted kernel to a trusted kernel, the trusted kernel can locate the handling entry for the kernel switching and perform the switching. Locating the handling entry for the kernel switching can be implemented in different manners.

Trusted kernel stack pointer register 120 is configured to store an independent stack pointer (e.g., a trusted kernel stack pointer) of the trusted kernel, the stack pointer pointing to a trusted kernel stack space. A trusted zone 130 can be saved in the trusted kernel stack space. Trusted zone 130 can include a current trusted kernel context. As shown in FIG. 1, trusted zone 130 in a trusted kernel stack space can include a program status register 131, a program pointer 132, and a general register 133 before the trusted kernel is switched last time. Further, program status register 131 can include a flag bit of a starting kernel. In some embodiments, the kernel switching can be implemented through at least one of a kernel switching instruction, a kernel switching return instruction, or an interrupt response. In some embodiments, when the kernel switching is performed by using the kernel switching return instruction, it can be determined, according to a flag bit of the starting kernel in the program status register 131, whether to return to the starting kernel or stay in the current kernel.

In some embodiments, when the kernel switching is performed by using the kernel switching instruction or the kernel switching return instruction, the trusted kernel can locate a kernel switching instruction exception entry (such as kernel switching instruction exception entry 111), according to an entry vector table called by a cross-kernel task of the trusted kernel. When the kernel switching is performed by using the interrupt response, the trusted kernel can locate the trusted interrupt handling entry (such as trusted interrupt handling entry 112), according to the trusted kernel exception vector table (such as trusted kernel exception vector table 110).

Figure 2:
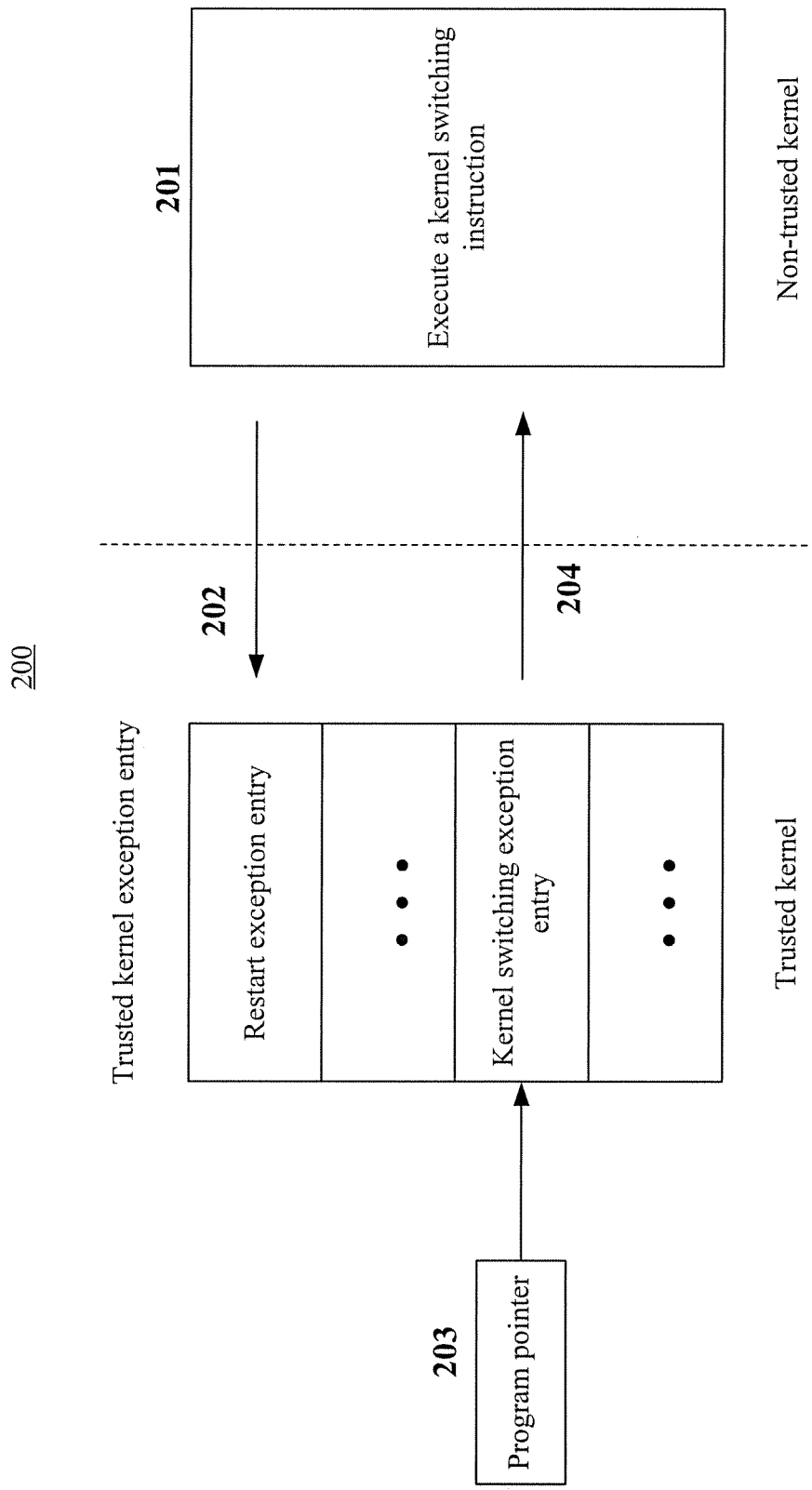
FIG. 2 is a schematic diagram illustrating an exemplary process of a data processor executing a kernel switching instruction, according to some embodiments of the present disclosure.

FIG. 2 shows a schematic diagram illustrating an exemplary process 200 of a data processor executing a kernel switching instruction according to some embodiments of the present disclosure. As shown in FIG. 2, in step 201, the data processor executes a kernel switching instruction in the non-trusted kernel. The data processor stores a non-trusted zone located in the non-trusted kernel and switches the non-trusted kernel to the trusted kernel through a switching process.

Further, in step 202, the data processor locates a kernel switching instruction exception entry in the trusted kernel exception vector table and performs kernel switching. In step 203, a kernel switching exception handling code of the trusted kernel executes a kernel switching instruction. In step 204, the trusted kernel returns to the non-trusted kernel through a switching process. The data processor can resume execution after restoring the non-trusted zone.

Figure 3:
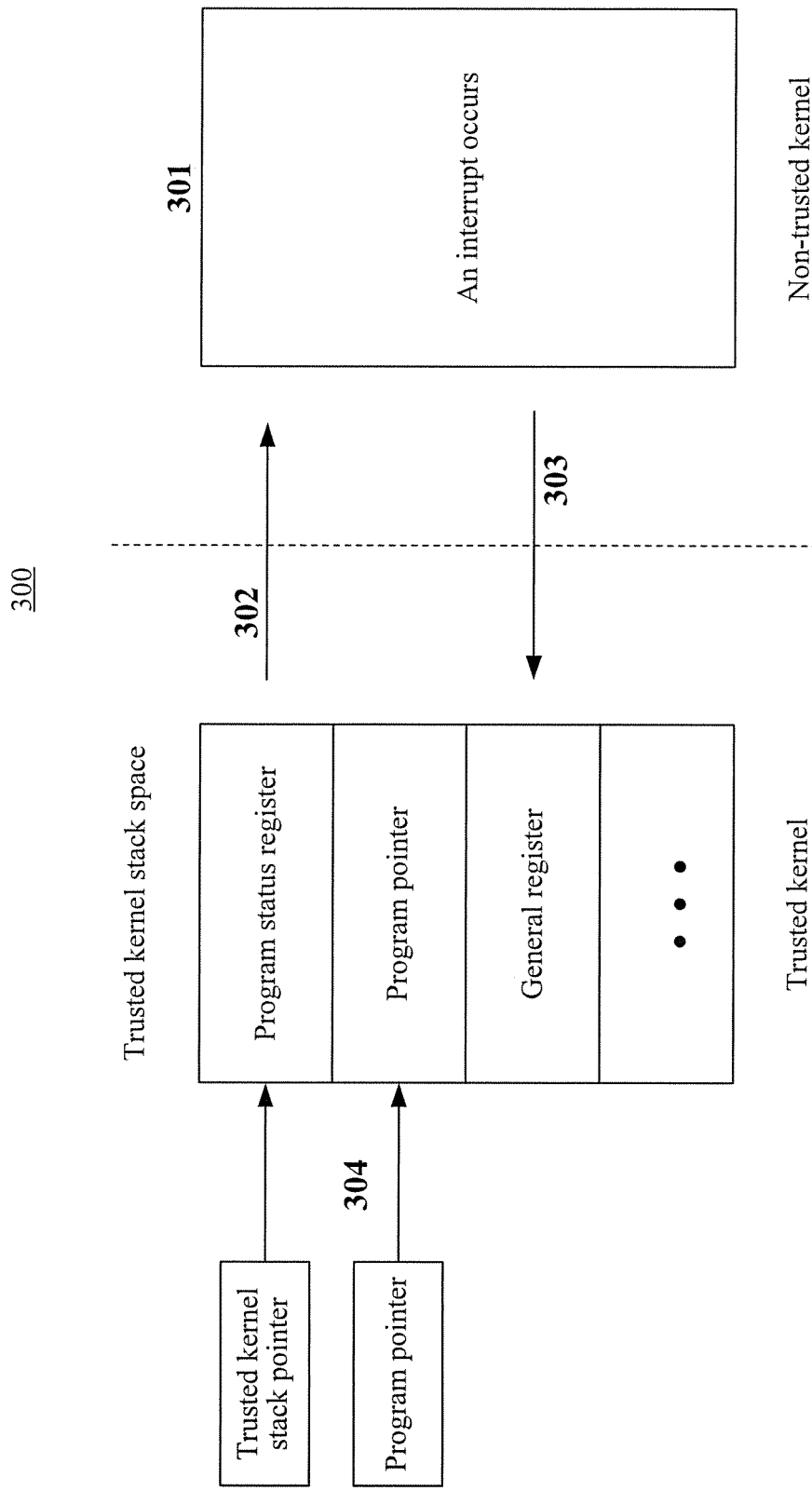
FIG. 3 is a schematic diagram illustrating an exemplary process of a non-trusted kernel executing a kernel switching return instruction to return to a trusted kernel after the trusted kernel responds to an interrupt of the non-trusted kernel, according to some embodiments of the present disclosure.

FIG. 3 is a schematic diagram illustrating an exemplary process 300 of a non-trusted kernel executing a kernel switching return instruction to return to a trusted kernel after the trusted kernel responds to an interrupt of the non-trusted kernel, according to some embodiments of the present disclosure. As shown in FIG. 3, the data processor runs in a trusted kernel. When an interrupt occurs in a non-trusted kernel (step 301), the data processor saves a trusted zone into a trusted kernel stack space. The data processor can then switch to the non-trusted kernel through a switching process (step 302), to respond to the interrupt. In some embodiments, a trusted kernel stack pointer register is configured to store a trusted kernel stack pointer that points to the foregoing trusted kernel stack space.

Further, in step 303, the non-trusted kernel switches to the trusted kernel through a kernel switching instruction executed by an interrupt handling function. In step 304, the data processor resumes execution after restoring the trusted zone, according to the trusted kernel stack space that the trusted kernel stack pointer of the trusted kernel stack pointer register points to.

Figure 4:
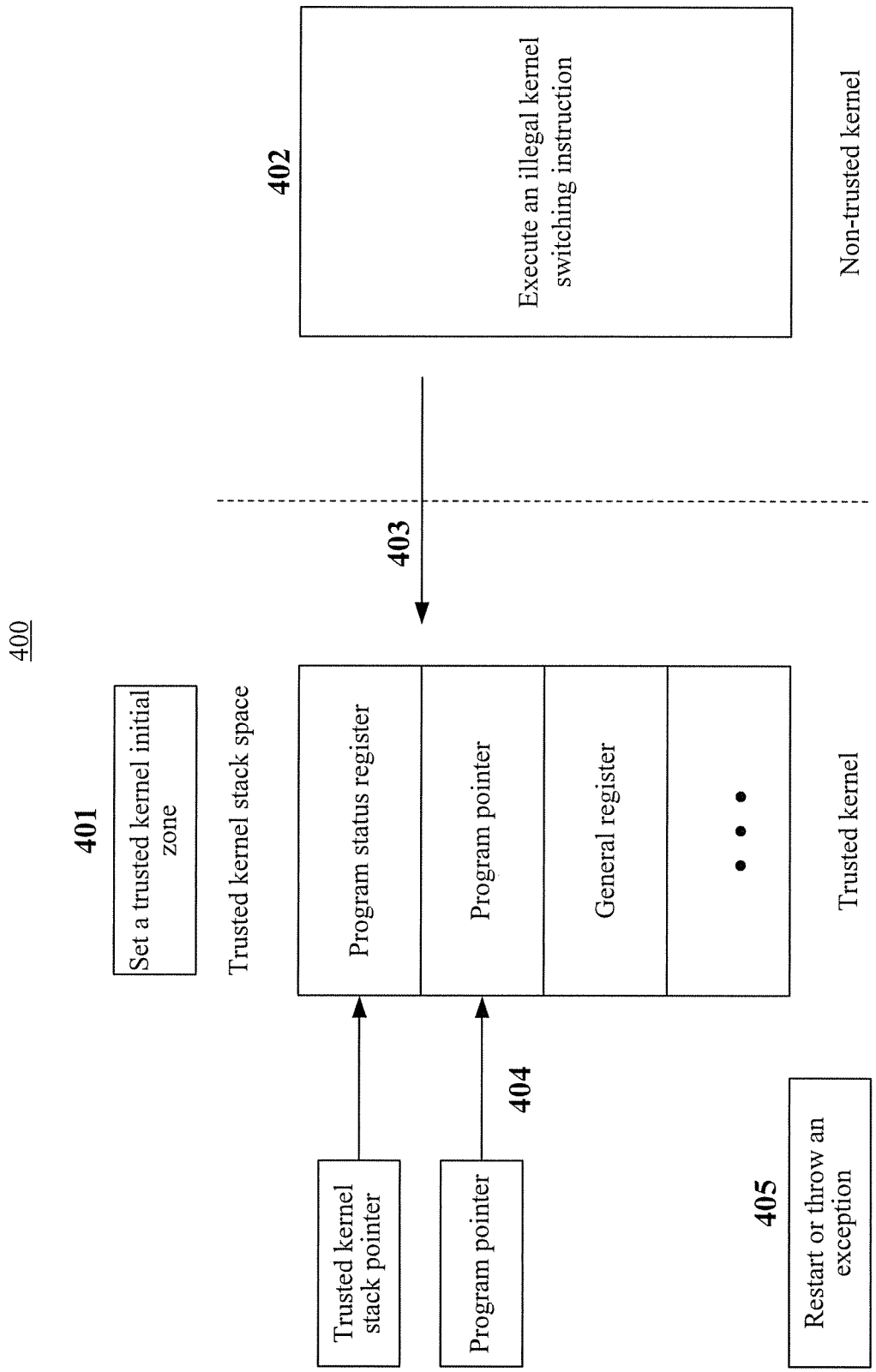
FIG. 4 is a schematic diagram illustrating an exemplary process of an illegal kernel switching exception, according to some embodiments of the present disclosure.

FIG. 4 is a schematic diagram illustrating an exemplary process 400 of an illegal kernel switching exception according to some embodiments of the present disclosure. As shown in FIG. 4, in step 401, the trusted kernel is provided with a zone before the trusted kernel proactively switches to the non-trusted kernel for the first time. The initial zone can be saved in the trusted kernel stack space that the trusted kernel stack pointer points to. In step 402, the trusted kernel is switched to the non-trusted kernel by executing the kernel switching instruction.

Further, in step 403, the non-trusted kernel modifies a flag bit of a starting kernel in the program status register and executes the kernel switching return instruction for switching to the trusted kernel. The data processor switches to the trusted kernel and resumes execution, after saving the non-trusted kernel zone.

In step 404, the data processor restores the trusted zone according to the trusted kernel stack space that the trusted kernel stack pointer points to. In step 405, after the data processor executes an illegal kernel switching exception handling code, the data processor can restart or discard the exception, thereby preventing illegal kernel intrusions.

According to some embodiments, the trusted kernel-based anti-attack data processors provided in the present disclosure can provide an underlying software protection mechanism for switching entries of the trusted kernel. Therefore, security of the switching process between a trusted kernel and a non-trusted kernel can be improved.

It is appreciated that the above descriptions are merely examples of some embodiments of the present disclosure, and they do not constitute any improper limit on the protection scope of the present disclosure. Variations or replacements can be made by a person skilled in the art consistent with the present disclosure. Such variations or replacements shall all be encompassed in the protection scope of the present disclosure defined by the following claims.

The invention claimed is:

1. A trusted kernel-based anti-attack data processor, comprising:
    a trusted kernel exception vector table configured to provide a handling entry for kernel switching;
    a trusted kernel stack pointer register configured to store a trusted kernel stack pointer that points to a trusted kernel stack space of a trusted kernel; and
    a trusted zone in the trusted kernel stack space, the trusted zone including a program status register configured to store a flag bit of a starting kernel for kernel switching; wherein:
    the data processor is configured to locate the handling entry for kernel switching and to perform the kernel switching by at least one of a kernel switching instruction, a kernel switching return instruction, or an interrupt response, and
    the trusted kernel is configured to restore the trusted zone from the trusted kernel stack space in response to the starting kernel flag bit in the program status register having been modified by the non-trusted kernel and the non-trusted kernel having been switched to the trusted kernel.

2. The data processor according to claim 1, wherein the handling entry for kernel switching includes at least one of a kernel switching instruction exception entry of the kernel switching instruction and a trusted interrupt handling entry of the kernel switching instruction.

3. The data processor according to claim 2, wherein when the data processor performs the kernel switching by the kernel switching return instruction, a determination is made whether to return to the starting kernel or stay in a current kernel based on the flag bit in the program status register.

4. The data processor according to claim 2, wherein the data processor is configured to locate the kernel switching instruction exception entry through an entry vector table called by a cross-kernel task.

5. The data processor according to claim 2, wherein the trusted kernel is configured to locate the trusted interrupt handling entry through the trusted kernel exception vector table.

6. The data processor according to claim 2, wherein when the trusted kernel is switched to a non-trusted kernel in response to a non-trusted interrupt, the trusted kernel is configured to save the trusted zone in the trusted kernel stack space;
    and after the non-trusted interrupt is handled by the non-trusted kernel, the trusted kernel is configured to restore the trusted zone when the non-trusted kernel is switched to the trusted kernel.

7. The data processor according to claim 6, wherein the trusted zone includes a zone before the trusted kernel is switched to the non-trusted kernel in response to the non-trusted interrupt.

8. The data processor according to claim 6, wherein the trusted zone includes a zone before the trusted kernel switches to the non-trusted kernel for a first time.

* * * * *

UNITED STATES PATENT AND TRADEMARK OFFICE
CERTIFICATE OF CORRECTION

Page 1 of 1

PATENT NO. : 10,909,246 B2
APPLICATION NO. : 16/175710
DATED : February 2, 2021
INVENTOR(S) : Xiaoxia Cui et al.

It is certified that error appears in the above-identified patent and that said Letters Patent is hereby corrected as shown below:

On the Title Page

Item (71), in the Applicant, Line 2, "Zhejiang (CN)" should read --Hangzhou, Zhejiang (CN)--.

Item (73), in the Assignee, Line 2, "Zhejiang (CN)" should read --Hangzhou, Zhejiang (CN)--.

Item (30), in the Foreign Application Priority Data, "2017 1 0648239" should read --201710648239.3--.

Signed and Sealed this
Twenty-sixth Day of September, 2023

Katherine Kelly Vidal
*Director of the United States Patent and Trademark Office*